Patented Oct. 31, 1950

2,527,810

UNITED STATES PATENT OFFICE 2,527,810

EPHEDRINE-PENICILLIN

Moses Wolf Goldberg, Upper Montclair, and Sidney Teitel, Rutherford, N. J., assignors to Hoffmann-La Roche Inc., Nutley, N. J., a corporation of New Jersey No Drawing. Application March 25, 1947,
Serial No. 737,107

2 Claims. (Cl. 260—302)

The present invention relates to new amine salts of penicillin and to methods for their production. By "penicillin" we mean each of the several antibiotic substances of the penicillin series, for example, penicillin F, penicillin G, penicillin K and penicillin X, or their mixtures, produced by the growth of a penicillin forming micro-organism, for example *Penicillium notatum* or *Penicillium chrysogenum*, in a nutrient medium, and each of the same substances produced by any other means.

At the present, only certain metal salts of penicillin such as sodium and calcium penicillin are employed therapeutically. Crystalline sodium penicillin G, because of its stability and activity, is considered to be the most desirable and useful type. Of somewhat similar stability are the recently described crystalline penicillin G salts of two tertiary amines; namely, the triethylamine salt of penicillin G and the N-ethyl-piperidine salt of penicillin G.

Attempts to produce stable penicillin salts of primary and secondary amines have heretofore not been successful, since treatment of penicillin with such amines has resulted in the inactivation of the pinicillin. This inactivation is, in effect, a decomposition of the penicillin by the amine, so what is obtained is actually not an inactive form of penicillin, but an entirely different compound; namely, the amine salt of the corresponding penicioic acid amide. More specifically, this decomposition of penicillin with primary and secondary amines has been demonstrated by the use of the primary amines, benzylamine, N-(1-naphthyl-4-azobenzene)-ethylenediamine and 2-methoxy-6-chloro-9-(N'-ethylene-diamine)-acridine, previously employed by other workers in this field, and by the use of the secondary amines, piperidine, morpholine and di-n-butylamine employed by us.

The decomposition reaction can be illustrated, for example, for the case of penicillin G and piperidine by the following equation:

In view of the fact that prior experience has shown that treatment of penicillin with various primary and secondary amines resulted in the destruction, that is the inactivation of penicillin, it is suprising that we have now found that primary and secondary amines of certain structure do not inactivate penicillin, but form amine salts of penicillin which retain substantially the biological activity of the penicillin. These new active amine salts of penicillin which are embraced in our invention are characterized by the fact that the nitrogen atom of the amine carries at least one hydrogen atom and is attached to at least one saturated carbon atom which carries no more than one hydrogen atom. This class of amines is structurally clearly distinguished from the amines which decompose penicillin in that the latter always contain the nitrogen atom attached to one or two carbon atoms, each of which carries at least two hydrogen atoms. On the other hand, in each instance where we have prepared amine salts of penicillin with an amine in which the nitrogen atom carries at least one hydrogen atom and is attached to at least one saturated carbon atom which carries no more than one hydrogen atom, the amine salts of penicillin obtained were found to be microbiologically active. More particularly, the amines of this general type employed in the production of the new salts of penicillin can be of aliphatic, araliphatic, alicyclic and hydroheterocyclic nature.

Illustrative of such amines are the following types:

Type I

Primary amines where the nitrogen atom is attached to one carbon atom carrying no more than one hydrogen atom as, for example, isopropylamine, 2-amino-butane, 2-amino-heptane, 2 - amino-hendecane, 2-amino-2-ethyl-propane (tertiary amyl-amine), 2-amino-6-phenyl-hexane, cyclohexylamine, 1-phenyl-2-amino-propane, 1-(3,4-dimethyl-phenyl)-2-amino-propane, 1 - (3,4 - dichloro - phenyl) - 2 - amino-propane,

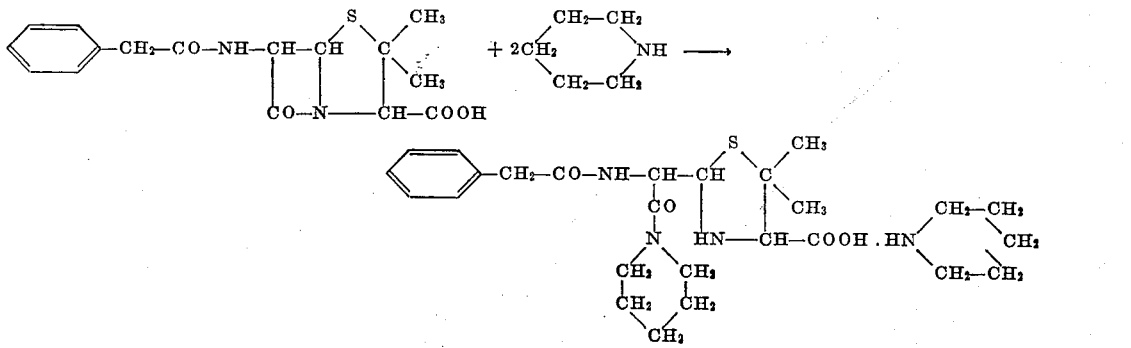

1-(2,4-dichloro-phenyl)-2-amino-propane, 1-(4-methyl - phenyl) - 2-amino-propane, 1-(5,6,7,8-tetrahydro-2-naphthyl)-2-amino-propane, ac-tetrahydro - β - naphthyl - amine, 2 - amino-4-phenyl-butane, and the like.

*Type II*

Secondary amines where the nitrogen atom is attached to two carbon atoms which contain no more than one hydrogen atom, such as di-isopropylamine, di-cyclohexylamine, 2,6-dimethyl piperidine, and the like.

*Type III*

Secondary amines where the nitrogen atom is attached to both a carbon atom carrying no more than one hydrogen atom and a carbon atom carrying three hydrogen atoms as, for example, desoxyephedrine, ephedrine and 1-(4-methyl-phenyl)-2-methylamino-propane.

*Type IV*

Secondary amines where the nitrogen atom is attached to a carbon atom carrying no more than one hydrogen atom and a carbon atom carrying two hydrogen atoms as, for example, 2-methyl piperidine.

The new organic amine salts of penicillin which comprise our invention are highly valuable for their antibiotic action. In addition, some of these salts are of unexpectedly low solubility in water, for example, the 2-amino-4-phenyl-butane, 2-amino-hendecane, 2-amino-heptane, and the 1-(3,4-dimethyl - phenyl)-2-amino - propane amine salts of penicillin G. Because of such low solubility of the amine salts, a new and simple method is provided for purifying and isolating penicillin from aqueous solutions, and the amine salt of penicillin thus formed, if desired, can then be converted into the corresponding alkali and alkali earth metal salts of penicillin as described in our application Serial No. 731,058, filed February 26, 1947, now U. S. Patent 2,493,625.

Unlike the heretofore-known tertiary amine salts, some of our new amine salts provide new therapeutic agents combining two different therapeutic actions. These are in general the salts of penicillin with an amine in which the nitrogen atom of the amine carries at least one hydrogen atom and is attached to the 2-carbon atom of an open carbon chain of at least three carbon atoms, said 2-carbon atom carrying no more than one hydrogen atom. For example, some of these 2-amino compounds are sympathomimetic drugs, and in the form of the corresponding penicillin salts, such as the salts with penicillin G, combine in one single compound both the microbiological activity of penicillin G and the sympathomimetic action of the amine. Examples of such amine salts of penicillin having combined activity are the following: 1-(3,4-dimethyl-phenyl)-2-amino-propane salt of penicillin G, 1-ephedrine salt of penicillin G, 1 phenyl-2-amino-propane salt of penicillin G and 2-amino-heptane salt of penicillin G.

In general, the penicillin amine salts of our invention can be readily obtained by adding an excess of the amine to a solution of the penicillin as the free acid in an anhydrous organic medium as, for example, anhydrous n-butylacetate or ether. The reaction product, which is the amine salt of penicillin, generally precipitates out directly in crystalline form. All of Type I amines directly gave crystalline salts except for 2-amino-butane and 1-phenyl-2-amino-propane which, however, could easily be crystallized. Most of Type II, III, and IV amines did not directly give crystalline penicillin G salts, but all except the desoxyephedrine salt could be crystallized. When the amine salts were not obtained directly in crystalline form, they could be prepared in this form by crystallization of the precipitate formed from a suitable solvent.

Due to the relatively low solubility of the amine penicillin G salts prepared from certain amines of Type I, such amine salts of penicillin G can also and expediently be prepared in aqueous media by simply mixing aqueous solutions of preferably equimolecular amounts of, for example, an alkali or alkali earth metal salt of penicillin G, such as, crystalline sodium penicillin G or calcium penicillin G, and an amine salt such as its hydrochloride, and filtering off the crystalline amine penicillin G salt thus formed. By this simple method, all of the Type I amines except those which form very soluble salts, such as isopropylamine, 2-amino-butane, and cyclohexylamine, can be converted, generally by employing them in the form of their hydrochlorides, directly into the corresponding crystalline amine salts of penicillin G.

In practicing this procedure of employing an aqueous medium for producing the amine salts of penicillin G, we have found it especially effective in the preparation of the 2-amino-hendecane, 2-amino-heptane, 2-amino-4-phenyl-butane and the 1-(3,4-dimethyl-phenyl)-2-amino-propane salts of penicillin G. The 2-amino-hendecane salt of penicillin is ten times less water-soluble than the 2-amino-heptane salt, while the 2-amino-4-phenyl-butane salt is less water soluble than the corresponding 1-phenyl-2-amino-propane salt.

The following examples will serve to illustrate the preparation of the new penicillin amine salts. It is to be understood that all the penicillin salts made from the d,l forms of amines containing an asymmetric carbon atom are mixtures of the corresponding diastereomeric salts. Accordingly, where we employ the designation (d+l), this is meant to denote that the penicillin salt formed from the racemic amine is a mixture of the two possible diastereomeric salts.

EXAMPLE 1

In this example, the (d+l)-1-(3,4-dimethyl-phenyl)-2-amino-propane salt of penicillin G is obtained from penicillin G as the free acid in an organic solvent with the free amine.

To 35 ml. of an anhydrous butyl acetate solution containing penicillin G as the free acid (derived from 1.53 grams of sodium penicillin G by acidification with phosphoric acid and extraction into butyl acetate) were added at room temperature 40 ml. of an anhydrous n-butyl acetate solution containing 0.82 gram of (d,l)-1-(3,4-dimethyl-phenyl)-2-amino propane. A crystalline precipitate formed immediately. The reaction mixture was stored at 4° C. for three hours, after which time the crystals were filtered off, washed with two 10 ml. portions of anhydrous n-butyl acetate, then with two 20 ml. portions of hexane and finally dried in vacuo at 50° C. White crystals melting at 124–128° C. were thus obtained. They had a microbiological activity against *Staphylococcus aureus* of 1209 u./mg. and against *Bacillus subtilis* of 1170 u./mg.

EXAMPLE 2

This example illustrates the method of obtaining the 1-(3,4-dimethyl-phenyl)-2-amino-propane salt of penicillin G from sodium penicillin G and the hydrobromide or sulfate of the amine in an aqueous medium.

To 3.56 grams of crystalline sodium penicillin G dissolved in 50 ml. of water were added 100 ml. of an aqueous solution containing 2.12 grams of (d,l)-1-(3,4-dimethyl-phenyl)-2-amino-propane sulfate. A crystalline precipitate formed immediately. The reaction mixture was stored at 4° C. for one hour, after which time the crystals were filtered off and washed with 25 cc. of ice water. The crystals were then dried over phosphorous pentoxide to constant weight. They had a *Staph. aureus* value of 1140 u./mg. and a M. P. of 112–126° C. Two recrystallizations from acetone gave a product with a M. P. of 129–131° C., and a *Staph. aureus* value of 1152 u./mg. and $[\alpha]_D^{25} = +205°$ (0.19% in water). The solubility in water at 27° C. was 0.25% and in acetone, 0.18%.

EXAMPLE 3

This example illustrates the production of the (d+l)-1-(3,4-dimethyl-phenyl)-2-amino-propane salt of penicillin G from the triethylamine salt of penicillin G, suspended in acetone, with an aqueous solution of the hydrobromide of the amine. To 2.18 grams of crystalline triethylamine salt of penicillin G suspended in 100 ml. of acetone at 25° C. were added with stirring, 15 ml. of an aqueous solution containing 1.22 grams of (d,l)-1-(3,4-dimethyl-phenyl)-2-amino-propane hydrobromide. Stirring was continued for one hour, after which time the crystalline reaction product was filtered off, washed with two portions of 10 ml. 90% acetone by volume and freed of solvent by drying over phosphorous pentoxide. The crystalline 1-(3,4-dimethyl-phenyl)-2-amino-propane salt of penicillin G thus obtained melted at 127–133° C. and had a *Staph. aureus* value of 1130 u./mg.

EXAMPLE 4

This example illustrates the preparation of the (d+l)-1-(3,4-dimethyl-phenyl)-2-amino-propane salt of penicillin G by precipitation from an aqueous solution containing an impure penicillin organo-metal salt, as, for example, impure calcium penicillin. To 10 ml. of a filtered aqueous solution containing two grams of calcium penicillin (potency 745 u./mg.) were added 1.46 grams of (d,l)-1-(3,4-dimethyl-phenyl)-2-amino-propane hydrobromide dissolved in 10 ml. of water. A precipitate immediately formed. After storage at 4° C. for one hour the reaction mixture was filtered and the yellow amorphous precipitate was washed with 3 ml. of water and finally dried over phosphorous pentoxide at 1 mm. vacuum. There was thus obtained a substance with a *Staph. aureus* value of 930 u./mg. and a *B. subtilis* value of 832 u./mg. This product was dissolved at 40° C. in 40 ml. of acetone, and the solution allowed to cool for twelve hours at 4° C. The white crystalline precipitate of the 1-(3,4-dimethyl-phenyl)-2-amino-propane penicillin G salt thus formed was washed with 5 cc. of acetone. After removal of the solvent at 50° C. in vacuo, it had a M. P. of 127–129° C. The *Staph. aureus* value was 1164 u./mg. and the *B. subtilis* value 1132 u./mg.

EXAMPLE 5

To 313 mg. of d(+)-1-(3,4-dimethyl-phenyl)-2-amino-propane tartrate dissolved in 7 ml. of water were added 3 ml. of an aqueous solution containing 356 mg. of crystalline sodium penicillin G. Crystals began to form immediately. After storage of the reaction mixture at 4° C. for one hour, the crystals were filtered off, washed with two 7 ml. portions of ice water and finally dried over phosphorous pentoxide at 1 mm. vacuum. There was obtained the d(+)-1-(3,4-dimethyl-phenyl)-2-amino-propane salt of penicillin G with the following properties: M. P. 125–129° C., $[\alpha]_D^{27} = +243°$ C. (0.07% in water), *Staph. aureus* value=1068 u./mg.; solubility in water about 0.25%; solubility in acetone about 0.4%.

In the same manner, the crystalline l(−)-1-(3,4-dimethyl-phenyl)-2-amino-propane salt of penicillin G was prepared by employing the l(−)-1-(3,4-dimethyl-phenyl)-2-amino-propane tartrate. The amine salt had a M. P. of 128–130° and $[\alpha]_D^{27} = +195°$, (0.09% in water). It assayed 1160 u./mg. against *Staph. aureus* and was found to be soluble to the extent of 0.25% in water and 0.18% in acetone. The mixed M. P. with the d-(+)-1-(3,4-dimethyl-phenyl)-2-amino-propane salt of penicillin G was 122–128° C. A mixed M. P. with the salt prepared by the method of Example 2 gave no depression of the M. P.

Of the various methods employed for producing the 1-(3,4-dimethyl-phenyl)-2-amino-propane salt of penicillin G illustrated by the above examples, the preferred method is that involving the interaction of an alkali metal salt of penicillin G with the hydrobromide, sulfate or tartrate of the 1-(3,4-dimethyl-phenyl)-2-amino-propane in an aqueous medium. This method is simple to practice and the salt is readily recovered from the aqueous medium. However, the method of forming this amine salt by precipitation from aqueous solutions containing an impure metal salt of penicillin, such as calcium penicillin, also results in high yields. It was found that although the 1-(3,4-dimethyl-phenyl)-2-amino-propane salt of penicillin K, which can be present in the precipitated penicillin amine salt when crude penicillin is used, is less soluble in water than the same salt of penicillin G, the latter is about ten times less soluble in acetone, so that several crystallizations from this solvent effectively removed the amine salt of penicillin K from the crude penicillin amine salt, to give the pure 1-(3,4-dimethyl-phenyl)-2-amino-propane salt of penicillin G. By such a crystallization procedure biologically inactive by-products are also effectively removed.

The 1-(3,4-dimethyl-phenyl)-2-amino-propane salts of penicillin G prepared as described in the Examples 1–5 retain both the microbiological activity of penicillin G and the sympathomimetic action of the amine. In vivo tests showed full penicillin potency in all infections tested. The salt proved to be stable toward heat at 56° C. in open ampules for at least eight days.

In Examples 1–4, (d,l)-1-(3,4-dimethyl-phenyl)-2-amino-propane was employed, and the corresponding penicillin G salt obtained was, therefore, a mixture of the two possible diastereometric salts. In Example 5, by starting off with the d- and the l-form of the amine, the d-(+)- and the l-(−)-amine salts of penicillin G were obtained. Comparison of the properties of the d- and the l-salt of penicillin G obtained from the d- and l-amine tartrates with the salt prepared from the (d,l)-amine, as obtained in Example 2, indicates that the latter, upon recrystallization, was predominantly the (l)-1-(3,4-dimethyl-phenyl)-

2-amino-propane salt of penicillin G. The preparation and fractional crystallization of the penicillin G salt thus provides an effective method for resolving (d,l)-1-(3,4-dimethyl-phenyl)-2-amino-propane.

EXAMPLE 6

*Isopropylamine salt of penicillin G*

To 100 ml. of an anhydrous butyl acetate solution containing 7.8 grams of penicillin G as the free acid were added 1.7 grams of isopropylamine. Crystals formed immediately. The reaction mixture was stored at 4° C. for 24 hours, after which time crystals were filtered off, washed with two 20 ml. portions of anhydrous ether and then dried in vacuo at 50° C. There was thus obtained 8.7 grams of white crystals melting at 124–126° C. with an assay value against *Staph. aureus* of 1326 u./mg.

EXAMPLE 7

To 200 ml. of anhydrous butyl acetate extract of crude penicillin (a similar aliquot yielded 8.3 grams of calcium penicillin with a *Staph. aureus* value of 820 u./mg. and a *B. subtilis* value of 740 u./mg.) were added 100 ml. of anhydrous benzene and 6.0 grams of isopropylamine. A precipitate formed immediately and the reaction mixture was filtered after storage at 4° C. for 48 hours. The yellow amorphous precipitate thus obtained was washed with two 25 ml. portions of anhydrous ether, dried in vacuo at 50° C. and was found to assay at 1000 u./mg. against *Staph. aureus* and 920 u./mg. against *B. subtilis*. It was then dissolved in 190 cc. of anhydrous isopropyl alcohol at 50° C. and the solution set aside at 4° C. for twelve hours. The white crystalline precipitate of the isopropylamine saft of penicillin G thus formed was filtered off, washed with 15 cc. of isopropanol and dried in vacuo at 50° C. The resulting salt had a M. P. of 123–125° C. and a *Staph. aureus* value of 1240 u./mg.

EXAMPLE 8

*(d+l)-2-amino butane salt of penicillin G*

To 100 ml. of an anhydrous butyl acetate solution containing 7.8 grams of penicillin G as the free acid were added 2.0 grams of (d,l)-2-amino-butane. A precipitate formed immediately. The reaction mixture was stored for 15 hours at 4° C., then filtered. The precipitate was washed with two 20 ml. portions of anhydrous ether and dried in vacuo at 50° C. There was thus obtained a product assaying 1200 u./mg. against *Staph. aureus*. Crystallization from acetone at 40° C. gave the (d+l)-2-amino-butane salt of penicillin G, melting at 105–107° C. with a *Staph. aureus* value of 1456 u./mg.

EXAMPLE 9

*(d+l)-2-amino-heptane salt of penicillin G*

To 1.54 grams of (d,l)-2-amino-heptane hydrochloride dissolved in 10 ml. of ice water was added a solution of 3.56 grams of crystalline sodium penicillin G in 20 cc. of ice water. Crystallization occurred instantly. Another 15 cc. of ice water were added, and the mixture stored at 4° C. for one hour. The crystals were filtered off, washed with 10 cc. of ice water and were then dried over phosphorous pentoxide at 1 mm. vacuum. The crystalline salt melted at 112–116° C. and had a *Staph. aureus* value of 1240 u./mg. Its solubility in water was about 1% at 25° C.

EXAMPLE 10

*(d+l)-2-amino-hendecane salt of penicillin G*

By employing (d,l)-2-amino-hendecane hydrochloride instead of (d,l)-2-amino-heptane hydrochloride and following the procedure of Example 9, there was obtained the (d+l)-2-amino-hendecane salt of penicillin G having a M. P. of 90–96° C. with a *Staph. aureus* value of 1200 u./mg. Its solubility in water was about 0.13% at 25° C.

EXAMPLE 11

*Cyclohexylamine salt of penicillin G*

To 100 ml. of an anhydrous butyl acetate solution containing 7.8 grams of penicillin G as the free acid were added 2.8 grams of cyclohexylamine. Crystallization occurred immediately. The reaction mixture was stored at 4° C. for 24 hours, after which time the crystals were filtered off, washed with two 20 cc. portions of anhydrous ether and dried in vacuo at 50° C. White crystals were thus obtained, having a M. P. of 128–138° C. and assaying 1205 u./mg. against *Staph. aureus*.

EXAMPLE 12

*(d+l)-2-amino-6-phenyl-hexane salt of penicillin G*

(d,l)-2-amino-6-phenyl-hexane, B. P. 121–126° C. at 8 mm., was prepared from cinnamylideneacetone and ammonia by catalytic reduction with hydrogen in the presence of Raney nickel at 100° C. and 1500 lb. pressure. The hydrochloride was made by neutralizing an ether solution of the free base with hydrogen chloride gas. It was recrystallized from alcohol-ether. M. P. 101–102° C. 334 mg. of this hydrochloride were dissolved in 10 ml. of water and 783 mg. of crystalline sodium penicillin G dissolved in 15 ml. of water were added. Crystallization occurred immediately. The crystals were filtered off after one hour storage at 4° C., washed with 3 ml. of ice water and finally dried over phosphorous pentoxide at 1 mm. vacuum. The crystalline (d+l)-2-amino-6-phenyl-hexane salt of penicillin G thus obtained had a M. P. of 91–96° C. and a *Staph. aureus* value of 912 u./mg. Recrystallization from acetone-ether gave a product melting at 92–95° C. with a *Staph. aureus* value of 1040 u./mg. The solubility in water of the compound was about 0.5%.

EXAMPLE 13

*(d+l)-1-phenyl-2-amino-propane salt of penicillin G*

To 35 ml. of an anhydrous ether solution containing 670 mg. of penicillin G as the free acid was added 580 mg. of (d,l)-1-phenyl-2-amino-propane dissolved in 35 ml. of anhydrous ether. Precipitation occurred immediately. After storage at 4° C. for about 12 hours, the reaction mixture was filtered. The white amorphous precipitate was washed with 10 ml. of anhydrous ether and was freed of solvent by drying in vacuo at 50° C. It assayed at 1250 u./mg. against *Staph. aureus*. Upon solution of the solid in a minimum of acetone at 40° C. and subsequent cooling, white silky needles were deposited. These, when freed of solvent, had a M. P. of 114–118° C. and a *Staph. aureus* value of 1250 u./mg. The solubility in water of the compound was about 2.0% at 27° C.

EXAMPLE 14

To 481 mg. of (d,l)-1-(3,4-dichlorophenyl)-2-amino-propane hydrochloride dissolved in 15 ml. of water were added at room temperature a solution of 712 mg. of crystalline sodium penicillin G dissolved in water. Instantaneous crystallization occurred. The mixture was stored at 4° C. for one hour and filtered. The crystals were washed with 5 cc. of ice water and dried to constant weight over phosphorous pentoxide at 2 mm. vacuum. The crystalline (d+l)-1-(3,4-dichlorophenyl)-2-amino-propane salt of penicillin G melted at 124–128° C., and had a *Staph. aureus* value of 970 u./mg.

In the same manner, but by employing (d,l)-1-(2,4-dichloro-phenyl)-2-amino-propane hydrochloride, there was obtained the crystalline (d+l)-1-(2,4-dichloro-phenyl)-2-amino-propane salt of penicillin G. It had a M. P. of 126–130° C. and a *Staph. aureus* value of 1040 u./mg.

The (d,l)-1-(3,4-dichloro-phenyl)-2-amino-propane hydrochloride and the (d,l)-1-(2,4-dichloro-phenyl)-2-amino-propane hydrochloride employed as starting materials can be obtained as follows:

28 grams of 2,4-dichlorophenyl-acetone, prepared by refluxing 108 grams of 2,4-dichlorophenyl acetic acid with 41 grams of anhydrous sodium acetate and 153 grams of acetic anhydride, were dissolved in 100 ml. of methanol. The solution was saturated with ammonia and 15 grams of Raney nickel, washed with methanol, were added. The solution was hydrogenated at 1,000 pounds pressure at 55–70° C. for 20 hours. Removal of the catalyst and methanol left an oil, which upon fractionation gave a fraction boiling at 138–140°/23 mm. The amine was dissolved in 200 ml. of anhydrous ether and precipitated with dry hydrogen chloride. After chilling, there was obtained the hydrochloride of 1-(2,4-dichlorophenyl)-2-amino-propane which melted at 192–193° C.

To prepare 1-(3,4-dichlorophenyl)-2-aminopropane, 38 grams of the oxime obtained by reacting 1-(3,4-dichlorophenyl)-2-oxopropane with hydroxylamine were dissolved in 200 ml. of methanol. Twenty grams of methanol-washed Raney nickel catalyst were added, and the mixture hydrogenated at 30° C. for 24 hours. After removal of the catalyst and the solvent, the residual oil was dissolved in anhydrous ether and the amine hydrochloride precipitated with dry hydrogen chloride. A heavy white precipitate appeared which was filtered and washed with dry ether. The salt was recrystallized from ethyl acetate and had a M. P. 179½–182° C.

EXAMPLE 15

To 460 mg. of (d,l)-1-(4-methylphenyl)-2-aminopropane hydrobromide dissolved in 5 ml. of water was added a solution of 783 mg. of crystalline penicillin G in 10 cc. of water. A white crystalline precipitate formed immediately. It was filtered off after one hour's storage at 4° C., washed with 3 cc. of ice water and dried over phosphorous pentoxide at 1 mm. vacuum. The crystalline compound thus obtained which was (d+l)-1-(4-methylphenyl)-2-amino-propane salt of penicillin G melted at 126–129° C. and had a *Staph. aureus* value of 1146 u./mg.

Following the same procedure, but employing 400 mg. of (d,l)-1-(2,4-dimethylphenyl)-2-amino-propane hydrochloride, there was obtained a crystalline salt of penicillin G having a M. P. of 125–127° C. and a *Staph. aureus* value of 1120 u./mg. The (d,l)-1-(2,4-dimethylphenyl)-aminopropane was prepared from 1-(2,4-dimethylphenyl)-2-propanone and ammonia by catalytic hydrogenation in the presence of Raney nickel catalyst. The hydrochloride was obtained from the free base by neutralization with hydrochloric acid and had a M. P. of 192° C.

EXAMPLE 16

Following the same procedure as in Example 12, but employing 452 mg. of (d,l)-1-(5,6,7,8-tetrahydro-2-naphthyl)-2-amino-propane hydrochloride, there was obtained the corresponding crystalline (d+l)-1-(5,6,7,8-tetrahydro-2-naphthyl)-2-amino-propane salt of penicillin G with a M. P. of 126–130° C., and a *Staph. aureus* value of 1120 u./mg. It has a solubility in water of about 0.1% at 26° C. The (d,l)-1-(5,6,7,8-tetrahydro-2-naphthyl)-2-amino-propane hydrochloride can be prepared from 2-tetralyl-acetone and ammonia by catalytic hydrogenation in the presence of a Raney nickel catalyst. The hydrochloride is obtained from the free base by neutralization with hydrochloric acid and has a M. P. of 216–217.5° C.

Following the same procedure as in Example 12, but employing 367 mg. of (d,l)-ac-tetrahydro-β-naphthylamine-hydrochloride, there was obtained the crystalline salt of (d,l)-ac-tetrahydro-β-naphthylamine penicillin G, which melts at 106–111° C. and has a *Staph. aureus* value of 1160 u./mg. It has a solubility in water of about 0.4% at 26° C.

In a similar manner as in Example 12 but employing (d,l)-2-amino-4-phenyl-butane hydrochloride, there was obtained (d+l)-2-amino-4-phenyl-butane salt of penicillin G, which melted at 117–120° C. and had a *Staph. aureus* value of 1220 u./mg. The solubility in water is about 0.9% at 26° C.

EXAMPLE 17

Di-isopropylamine salt of penicillin G

To 100 ml. of an anhydrous n-butyl acetate solution containing 7.8 grams of penicillin G as the free acid were added at room temperature 2.8 grams of di-isopropylamine. The solution was stored at 4° C. for 15 hours. Addition of 200 ml. of anhydrous ether caused precipitation of an amorphous material. The latter, when freed of solvent at 25° C. in vacuo, was obtained as a white fluffy powder assaying 1170 u./mg. against *Staph. aureus*. Crystallization from acetone gave the crystalline di-isopropylamine salt of penicillin G melting at 113–119° C. and having a *Staph. aureus* value of 1200 u./mg.

EXAMPLE 18

Dicyclohexylamine salt of penicillin G

To 100 ml. of n-butyl acetate solution containing 7.8 grams of penicillin G as the free acid were added 5.0 grams of dicyclohexylamine. After storage at 4° C. for 15 hours there were added 200 ml. of anhydrous ether. A heavy precipitate formed immediately. The latter was filtered off, washed with 50 ml. of ether and freed of solvent at 50° C. in vacuo. The salt assayed 1296 u./mg. against *Staph. aureus*. Crystallization from acetone and recrystallization from acetonitrile gave the pure crystalline dicyclohexylamine salt of penicillin G melting at 146–148° C. with a *Staph. aureus* value of 1200 u./mg.

EXAMPLE 19

2,6-dimethyl-piperidine salt of penicillin G

To 100 ml. of an n-butyl acetate solution containing 7.8 grams of penicillin G as the free acid were added 3.2 grams of 2,6-dimethyl piperidine. No precipitation occurred even after storage at 4° C. for 24 hours. Two hundred ml. of anhydrous ether were added and the mixture was stored for 24 hours at 4° C. An amorphous material separated. The supernatant solution was decanted and the residue freed of solvent, then vacuum dried for 24 hours at 1 mm. The yellowish powder thus obtained had a *Staph. aureus* value of 1040 u./mg. Crystallization from acetone gave rosettes with a M. P. of 97–102° C. and a *Staph. aureus* value of 1341 u./mg.

EXAMPLE 20 l-ephedrine salt of penicillin G

To 30 ml. of an anhydrous ether solution containing 1.47 grams of penicillin G as the free acid was added 0.83 gram of l-ephedrine dissolved in 25 ml. of anhydrous ether. An amorphous precipitate formed immediately. After storage of the reaction mixture at 4° C. for 48 hours the solvent was decanted and the residues washed with 50 ml. of anhydrous ether. Scratching with a glass rod induced crystallization. The crystals had a M. P. of 106–113° C. and a *Staph. aureus* value of 1210 u./mg. Crystallization from acetone-ether gave pure l-ephedrine salt of penicillin G, melting at 135–137° C. with decomposition, $[\alpha]_D^{26} = +190°$ C. (2.5% in water), having a *Staph. aureus* value of 1248 u./mg.

The crystalline l-ephedrine salt of penicillin G can be obtained directly, when a butyl acetate solution of penicillin G as the free acid is used, instead of the above-mention ether solution.

EXAMPLE 21 d,l-Desoxyephedrine salt of penicillin G

To 100 ml. of an anhydrous ether solution containing 4.90 grams of penicillin G as a free acid were added at 4° C., 1.49 grams of d,l-desoxyephedrine. An amorphous precipitate formed immediately. It was separated from the solvent, washed with ether and finally dried at 1 mm. vacuum for 24 hours. There was thus obtained a white amorphous powder assaying 1092 u./mg. against *Staph. aureus*.

EXAMPLE 22

(d+l)-2-methyl-piperidine salt of penicillin G

To 30 ml. of an anhydrous ether solution containing 1.47 grams of penicillin G as a free acid was added 0.5 gram of (d,l)-2-methyl piperidine. The clear solution after storage at 4° C. for 48 hours deposited a precipitate. The latter, when freed of solvent by drying at 1 mm. vacuum, was obtained as a white amorphous powder assaying 1152 u./mg. against *Staph. aureus*. Crystallization from acetonitrile gave the crystalline (d+l)-2-methyl piperidine salt of penicillin G melting at 81–86° C. and assaying 1220 u./mg. against *Staph. aureus*.

EXAMPLE 23

(d+l)-1-(3,4-dimethyl-phenyl)-2 - amino - propane salt of penicillin K

To 122 mg. of (d,l)-1-(3,4-dimethylphenyl)-2-amino-propane hydrobromide dissolved in 2.5 ml. of ice water were added 183 mg. of sodium penicillin K, also dissolved in 2.5 ml. of ice water. A crystalline salt was immediately formed. It was filtered off, washed with 3 ml. of ice water and dried over phosphorous pentoxide at 1 mm. vacuum. It melted at 106–113° C. and had a *Staph. aureus* value of 1400 u./mg. The *Staph. aureus/B. subtilis* ratio was 0.41, the solubility in water at 25° C. was about 0.08% and in acetone 1.4%.

EXAMPLE 24

2-amino-2-ethyl-propane salt of penicillin G

To 50 ml. of an anhydrous ether solution containing 1.9 grams of penicillin G as the free acid were added 0.7 gram of t-amyl-amine (2-amino-2-ethyl-propane). Instant precipitation took place. The reaction mixture was centrifuged after storage at 4° C. for three hours. The residue was titurated with ether and the mixture recentrifuged. The white colored precipitate was then freed of solvent at 50° in vacuo. The powder assayed 1188 units per mg. against *Staph. aureus*. Crystallization from acetone gave needles melting at 125–129° C. and assaying 1272 units per mg. against *Staph. aureus*.

Thus it will be seen that our invention provides new organic amine salts of penicillin in which the nitrogen atom of the amine carries at least one hydrogen atom and is attached to at least one saturated carbon atom carrying no more than one hydrogen atom. These salts all possess antibiotic activity. Some combine two therapeutic agents in a single compound, such as those of the substituted isopropylamines as, for example, the 1-(3,4-dimethyl-phenyl)-2-amino-propane salt of penicillin G, the l-ephedrine salt of penicillin G, the (d,l)-desoxyephedrine salt of penicillin G, the (d+l)-1-(3,4-dimethyl-phenyl)-2-amino-propane salt of penicillin K, the 1-phenyl-2-amino-propane salt of penicillin G, the 2-amino heptane salt of penicillin G, and the like. Furthermore, the amine salts constituting our invention are also highly suitable as intermediates in the production of alkali and alkali earth metal salts of penicillin G by the methods described in our copending application, Serial No. 731,058, of which the instant application is a continuation-in-part. In addition, certain of the salts are highly insoluble in water and lend themselves to the purification and isolation of the various types of penicillin from aqueous solutions.

We claim:
1. Crystalline laevo-ephedrine salt of penicillin G.
2. Ephedrine salt of penicillin G.

MOSES WOLF GOLDBERG.
SIDNEY TEITEL.

REFERENCES CITED

The following references are of record in the file of this patent:

British J. of Exp. Pathology, vol. 23, June 1942, pp. 103–115.
Science, Feb. 23, 1945.
Physicians Bulletin, Nov.-Dec., 1945, p. 183.
British Reports, 234, Feb. 12, 1946, pp. 1–5.
Heyden Reports, H II, pp. 1, 2.
Heyden Reports, H IV, pp. 1, 2.

Certificate of Correction

Patent No. 2,527,810                        October 31, 1950

MOSES WOLF GOLDBERG ET AL.

It is hereby certified that error appears in the printed specification of the above numbered patent requiring correction as follows:

Columns 1 and 2, extreme right-hand portion of the third formula thereof, for 

column 2, line 5, for "suprising" read *surprising*; column 3, lines 62 and 63, for "1 phenyl" read *1-phenyl*; column 4, line 61, between the words "amino" and "propane" insert a hyphen; column 5, line 40, for "127–133° C." read *128–133° C.*; column 6, line 66, for "diastereometric" read *diastereomeric*; column 11, line 39, for "above-mention" read *above-mentioned*; column 12, line 23, for "50°" read *50° C.*;

and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*